United States Patent [19]

Bockstie, Jr.

[11] 4,250,276

[45] Feb. 10, 1981

[54] FAST CURING COATING COMPOSITION

[75] Inventor: Lawrence G. Bockstie, Jr., Bradford, Pa.

[73] Assignee: Corning Glass Works, Corning, N.Y.

[21] Appl. No.: 716,061

[22] Filed: Aug. 19, 1976

Related U.S. Application Data

[62] Division of Ser. No. 486,395, Jul. 8, 1974, Pat. No. 4,179,477.

[51] Int. Cl.$^3$ ............................................. C08F 279/02
[52] U.S. Cl. ............................... 525/263; 260/29.1 SB; 428/447; 525/288
[58] Field of Search ............ 260/827, 465 UA, 880 R, 260/29.1 SB; 427/101, 387; 428/447; 525/263, 288

[56] References Cited

U.S. PATENT DOCUMENTS

| 2,867,603 | 1/1959 | Safford et al. | 260/827 |
|---|---|---|---|
| 3,062,242 | 11/1962 | Nanderbilt | 138/141 |
| 3,291,600 | 12/1966 | Nicoll | 96/1 R |
| 3,433,760 | 3/1969 | Clark et al. | 260/37 |
| 3,484,333 | 12/1969 | Vanderbilt | 161/93 |
| 3,801,418 | 4/1974 | Cornelis | 427/166 |
| 3,911,166 | 10/1975 | Bailey | 427/387 |
| 3,970,709 | 7/1976 | Owston | 260/827 |
| 4,033,840 | 7/1977 | Fujiwara et al. | 260/880 R |
| 4,038,441 | 7/1977 | Dubois | 427/166 |

*Primary Examiner*—Hosea E. Taylor
*Assistant Examiner*—Amelia B. Yarbrough
*Attorney, Agent, or Firm*—Walter S. Zebrowski; Clarence R. Patty, Jr.

[57] ABSTRACT

A rapid curing polybutadiene resin system dielectric coating composition suitable for coating electrical components such as thin film resistors is disclosed. This composition cures very rapidly and greatly improves adhesion to the coated article.

5 Claims, No Drawings

FAST CURING COATING COMPOSITION

CROSS-REFERENCE TO RELATED APPLICATION

This is a divisional application of Ser. No. 486,395 filed July 8, 1974, now U.S. Pat. No. 4,179,477.

BACKGROUND OF THE INVENTION

1. Field of the Invention

The present invention relates to a dielectric coating composition suitable for coating electrical components such as, for example, thin film resistors as described in U.S. Pat. Nos. 2,564,706 and 2,564,707 to J. M. Mochel and 2,934,736 to J. K. Davis.

2. Description of the Prior Art

It is known in the prior art to coat electrical components such as thin film resistors with a protective coating. The prior art is faced with the problem, however, that these protective coatings require relatively long curing periods, and in the case of thin film resistors, there is found substantial resistance drift during the application and curing of such coatings. Furthermore, poor adhesion of the coating to the component surface has also been a problem. This significantly increases the cost of manufacturing such components and permits a relatively low yield of components having desired values.

SUMMARY OF THE INVENTION

The objects of this invention are to provide a dielectric coating composition suitable for coating electrical components which is rapid curing, provides excellent adhesion, minimizes resistance drift, is economical, and overcomes the heretofore noted disadvantages.

Broadly, according to the present invention, a dielectric coating composition suitable for coating electrical components is provided having from about 35 to 90 parts by weight of a polybutadiene resin system and from about 10 to 65 parts by weight of at least one silane selected from the group of vinyltriethoxysilane, vinyl silane, vinyltriacetoxysilane, and vinyltrimethoxysilane. The polybutadiene resin system is formed of about 45 to 85 parts by weight of polybutadiene resin having a molecular weight between about 750 and 14,000, at least about 75 percent concentration of pendant vinyl groups and a molecular structure of

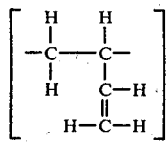

from about 1 to 5 parts by weight of at least one catalyst selected from the group of dicumyl peroxide, benzoyl peroxide, lauroyl peroxide, and t-butyl hydroperoxide, and 0 to 40 parts by weight of at least one monomer selected from the group of vinyl toluene, t-butylstyrene, alkyl substituted styrene, and diallyl maleate.

Additional objects, features, and advantages of the present invention will become apparent to those skilled in the art from the following detailed description in which, by way of example, the preferred embodiments of this invention are illustrated.

DETAILED DESCRIPTION

For the purposes of simplicity, the present invention will be described in connection with the coating of a thin film resistor of tin and/or antimony oxide on a glass or ceramic substrate, however, the present invention is in no way limited to such an application rather is applicable to coating other electrical components or other articles.

The polybutadiene resins suitable as a base material for the polybutadiene resin system of the present invention are those resins or mixtures of resins having a molecular weight of between 750 and 14,000, at least about 75 percent concentration of pendant vinyl groups and a fundamental molecular structure as follows:

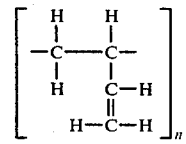

A particularly suitable polybutadiene resin is Hystl B-1000 produced by the Hystl Development Company of Redondo Beach, Calif. This resin has a molecular weight of about 1000. Other suitable polybutadiene resins are Hystl B-2000 having a molecular weight of about 2000, and Hystl B-3000 having a molecular weight of about 3000 also produced by the Hystl Development Company; Ricon 150 produced by The Richardson Company of Melrose Park, Ill., having a molecular weight of about 2000; and Firestone PD-702 having a molecular weight of approximately 10,000 and Firestone PD-703 having a molecular weight of over about 10,000 produced by the Firestone Synthetic Rubber and Latex Company of Akron, Ohio.

Although a satisfactory coating composition may be formulated without a reactive monomer, a far superior composition is obtained by adding 10 to 40 parts by weight of at least one reactive monomer. Examples of suitable reactive monomers include vinyl toluene, t-butylstyrene, alkyl substituted styrene, and diallyl maleate.

A particularly suitable catalyst for the polybutadiene resin system is dicumyl peroxide. This peroxide catalyst is available as Di-Cup R produced by Hercules, Inc. of Wilmington, Del. Other suitable peroxide catalysts are benzoyl peroxide, lauroyl peroxide, and t-butyl hydroperoxide.

After the polybutadiene resin system is formulated of polybutadiene resin, reactive monomer, and catalyst, it is usually necessary to slightly heat the mixture to a temperature of about 40° C. to form a homogeneous liquid. Thereafter, the liquid is allowed to cool to room temperature before the silane is added. The amount of silane to be added can vary from about 10 parts to about 65 parts by weight of the total composition. The more silane added to the polybutadiene system, the lower the viscosity of the coating material becomes. A particularly suitable silane for the present composition is vinyltriethoxysilane. This material is available as Union Carbide A-151 produced by the Union Carbide Corporation, Chemicals and Plastics Division, of New York, N.Y. Other suitable silanes are vinyl silane known as Union Carbide A-172 also produced by the Union Carbide Corporation, vinyltriacetoxysilane available as Dow Corning Z-6075, and vinyltrimethoxysilane available as Dow Corning Y-2525, the latter two silanes are produced by the Dow Corning Corporation of Midland, Mich.

It has been found that the polybutadiene resins may be unterminated, or terminated in carboxy, hydroxy, or other functional groups. A combination of polybutadiene resins having different molecular weights can also be used in one composition. It has also been found that to obtain predetermined desired compositions, more than one reactive monomer, catalyst, and silane may be used. Also, if desired, fillers may be added to the coating composition to alter physical properties such as thermal conductivity, linear coefficient of expansion, and the like. Thixatropic material and pigments may also be added when desired. The desired processing characteristics of the coating composition and the desired properties of the cured composition can be controlled by the composition of the silane-polybutadiene resin system mixture. For example, a very low viscosity coating composition will have a maximum amount of silane and a maximum amount of reactive monomer in the polybutadiene resin system.

EXAMPLE 1

As a typical example of the present invention, a coating composition was prepared including 65 parts by weight of Firestone PD-702 polybutadiene resin, that is a polybutadiene resin having molecular weight of approximately 10,000 and at least about 75 percent concentration of pendant vinyl groups as heretofore described. 25 Parts by weight of vinyl toluene, a reactive monomer, was added to the polybutadiene resin as was 2.5 parts by weight dicumyl peroxide and the resultant mixture of the polybutadiene resin system was heated to a temperature of about 40° C. and gently stirred until it was homogeneous. This polybutadiene resin system was then allowed to cool to room temperature at which time the coating composition was formulated by mixing 50 parts by weight of the above prepared polybutadiene resin system and 45 parts by weight of vinyltriethoxysilane. After the composition was homogeneous, the coating is applied to a tin and antimony oxide resistor on a glass substrate by means of a spray or wheel in a manner known in the art. The coated resistor was then subjected to a temperature of 300° C. for less than one minute. Usually about 45 seconds is necessary for curing. Care must be taken that any elevated temperatures used in the curing of the coating composition is not otherwise detrimental to the electrical component or other article being coated.

It was found that this coating composition and the above curing not only provided very rapid curing but permitted greatly improved adhesion of the coating to the electrical resistor, as well as minimizing the resistance drift of the resistor being coated. Selection of resistors having the desired resistance value increased from less than 55 to over 90 percent. Following Table I sets out various other examples of the present polybutadiene resin system.

TABLE I

| | Polybutadiene Resin Systems | | | | | |
|---|---|---|---|---|---|---|
| Example | Polybutadiene Resin | Resin Weight Percent | Reactive Monomer | Monomer Weight Percent | Catalyst | Catalyst Weight Percent |
| 2 | Hystl B-1000 polybutadiene | 80.0 | vinyl toluene | 16.5 | dicumyl peroxide | 3.5 |
| 3 | Hystl B-1000 polybutadiene | 65.5 | vinyl toluene | 30.0 | dicumyl peroxide | 4.5 |
| 4 | Hystl B-1000 polybutadiene | 50.0 | vinyl toluene | 45.0 | dicumyl peroxide | 5.0 |
| 5 | Hystl B-1000 polybutadiene | 75.0 | t-butylstyrene | 20.0 | dicumyl peroxide | 5.0 |
| 6 | Hystl B-1000 polybutadiene | 80.0 | t-butylstyrene | 17.5 | dicumyl peroxide | 2.5 |
| 7 | Hystl B-2000 polybutadiene | 70.0 | t-butylstyrene | 26.0 | dicumyl peroxide | 4.0 |
| 8 | Firestone PD-702 polybutadiene | 60.0 | t-butylstyrene | 35.0 | dicumyl peroxide | 5.0 |
| 9 | Hystl B-3000 polybutadiene | 55.0 | vinyl toluene | 41.5 | t-butyl hydroperoxide | 3.5 |
| 10 | Hystl B-3000 polybutadiene | 60.0 | t-butylstyrene | 36.0 | dicumyl peroxide | 4.0 |

Following Table II sets out various other examples of the present coating composition.

TABLE II

| | Coating Compositions | | | | | | |
|---|---|---|---|---|---|---|---|
| Example | Polybutadiene Resin System From Table I | Resin Systems Weight Percent | Silane | Silane Weight Percent | Coating Temp. When Applied °C. | Curing Time sec. | Curing Temp. °C. |
| 2 | Example 3 | 60.0 | vinyltriethoxysilane | 40.0 | 25 | 45 | 300 |
| 3 | Example 3 | 75.0 | vinyltriethoxysilane | 25.0 | 25 | 50 | 300 |
| 4 | Example 4 | 65.0 | vinyltriethoxysilane | 35.0 | 25 | 50 | 295 |
| 5 | Example 4 | 65.0 | vinyltrimethoxysilane | 35.0 | 25 | 45 | 300 |
| 6 | Example 4 | 85.0 | vinyltrimethoxysilane | 15.0 | 25 | 40 | 300 |
| 7 | Example 2 | 45.0 | vinyltriethoxysilane | 55.0 | 25 | 40 | 300 |
| 8 | Example 8 | 60.0 | vinyltrimethoxysilane | 40.0 | 25 | 55 | 300 |
| 9 | Example 7 | 75.0 | vinyltriethoxysilane | 25.0 | 25 | 45 | 295 |
| 10 | Example 10 | 65.0 | vinyltriethoxysilane | 35.0 | 25 | 50 | 300 |

It is to be noted that to any of the preceding example compositions desirable and appropriate pigments, fillers, extenders, and special additives may be added.

Although the present invention has been described with respect to details of certain embodiments thereof, it is not intended that such details be limitations upon the scope of the invention except insofar as set forth in the following claims.

I claim:

1. An electrical component coated with a dielectric coating composition consisting essentially of
   (a) from about 35 to 90 parts by weight of a polybutadiene resin system consisting essentially of 45 to 85 parts by weight of a polybutadiene resin having a molecular weight between about 750 to about 14,000, at least about 75 percent concentration of pendant vinyl groups and a molecular structure of

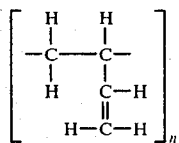

1 to 5 parts by weight of at least one catalyst selected from the group consisting of dicumyl peroxide, benzoyl peroxide, lauroyl peroxide, and t-butyl hydroperoxide, and up to 40 parts by weight of at least one reactive monomer selected from the group consisting of vinyl toluene, t-butylstyrene, alkyl substituted styrene and diallyl maleate, and (b) from about 10 to 65 parts by weight of at least one silane selected from the group consisting of vinyltriethoxysilane, vinyl silane, vinyltriacetoxysilane, and vinyltrimethoxysilane.

2. The article of claim 1 wherein said reactive monomer is present in an amount of 10 to 40 parts by weight of said polybutadiene resin system.

3. The article of claim 2 wherein said component is an electrical resistor.

4. The article of claim 2 wherein said component is an electrical resistor comprising a coating containing tin oxide on a dielectric substrate.

5. The article of claim 2 wherein said polybutadiene resin has a molecular weight of about 10,000 said catalyst is dicumyl peroxide, said reactive monomer is vinyl toluene, and said silane is vinyltriethoxysilane.

\* \* \* \* \*